United States Patent
Slegers

[11] Patent Number: 5,892,794
[45] Date of Patent: Apr. 6, 1999

[54] DIGITAL COMMUNICATION SYSTEM, A COMMUNICATION STATION FOR USE IN THE SYSTEM, AND A METHOD FOR USE IN THE STATION

[75] Inventor: Walter J. Slegers, Eindhoven, Netherlands

[73] Assignee: U.S. Philips Corporation, New York, N.Y.

[21] Appl. No.: 749,433

[22] Filed: Nov. 15, 1996

[30] Foreign Application Priority Data

Nov. 20, 1995 [EP] European Pat. Off. .............. 95203165

[51] Int. Cl.[6] ............................... H04B 1/38; H04L 5/16; H04L 5/14; H04Q 7/00
[52] U.S. Cl. .......................... 375/219; 375/219; 375/222; 370/294; 370/329; 370/336; 370/337; 370/347; 455/450; 455/452; 455/557
[58] Field of Search ..................... 375/216, 219, 375/222; 370/294, 329, 337, 347, 336; 455/517, 553, 557, 450, 452

[56] References Cited

U.S. PATENT DOCUMENTS

| | | | |
|---|---|---|---|
| 4,837,858 | 6/1989 | Ablay et al. ............................... | 455/34 |
| 5,164,982 | 11/1992 | Davis .................................... | 379/93.17 |
| 5,231,381 | 7/1993 | Duwaer .................................... | 340/712 |
| 5,267,245 | 11/1993 | Maruyama et al. ..................... | 370/109 |
| 5,325,419 | 6/1994 | Connolly et al. ........................ | 379/60 |
| 5,396,539 | 3/1995 | Slekys et al. ............................. | 379/59 |
| 5,418,838 | 5/1995 | Havermans et al. ...................... | 379/60 |
| 5,493,609 | 2/1996 | Winseck, Jr. et al. .................... | 379/96 |
| 5,521,925 | 5/1996 | Merakos et al. ........................ | 370/337 |
| 5,671,219 | 9/1997 | Jensen et al. ............................ | 370/280 |

FOREIGN PATENT DOCUMENTS 941023962  9/1994  European Pat. Off. .

OTHER PUBLICATIONS

"Cordless Telecommunications in Europe", The Evolution of Personal Communications, Wally H.W. Tuttlebee, Springer Verlag, 1990, Appendix 3, pp. 273–284.
ETSI Dect Standard ETS 300 175–3, 1993, p. 1 and pp. 43–52.
Draft dect Standard PR ETS 300 435, Sep. 1994, pp. 1–13.
Dect Cordless Telephony System as Standarised by ETSI Technical Report, May 1994.

*Primary Examiner*—Stephen Chin
*Assistant Examiner*—Michael W. Maddox
*Attorney, Agent, or Firm*—D. Halajian

[57] ABSTRACT

Known is a digital communication system comprising wireless terminals for voice and non-voice data communication. In order to get a flexible mixed voice and non-voice data communication system terminals for mixed real time voice and reliable non-voice data communication are provided in which set-up channels are dynamically assigned to non-voice or to mixed voice and non-voice communications without first releasing the assigned communication resources. Herewith, at a higher level layer such as an application layer very fast switching over is achieved while other devices in the system are fully unaware of such switching over. In multimedia communications, such a fast switching over is particularly advantageous.

12 Claims, 3 Drawing Sheets

DIGITAL COMMUNICATION SYSTEM, A COMMUNICATION STATION FOR USE IN THE SYSTEM, AND A METHOD FOR USE IN THE STATION

FIELD OF THE INVENTION

The present invention relates to a digital communication system comprising a first station having a first digital radio unit and a second station having a second digital radio unit that is arranged for wireless communication with the first station, whereby the system is arranged for voice and non-voice communication. Such a system can be a cordless telephony system such as a so-called DECT (Digital European Cordless Telecommunications) system, a cellular mobile radio system, a stand-alone local wireless system or a wireless LAN applying similar techniques, a combination of such systems, a multimedia system, or any other suitable system.

The present invention further relates to a radio station for use in such a system and to a method for use in the station.

BACKGROUND OF THE INVENTION

A digital communication system of this kind is known from the European patent application EP 0 615 393. In EP 0 615 393 non-voice data packets are transmitted on a cellular voice network by means of so-called data phones whereas voice communication is done via voice phones. In the known system a pool of free voice channels is reserved for the data phones that try to seize a free channel from the pool when a digital data transmission is needed. If unsuccessful, the data phone tries again within a matter of a few seconds. Such a system is not very suitable for mixed voice and non-voice data communication via a single station when there is a need for quickly varying operation modes between voice and/or non-voice data communication. In particular, in multimedia communications the station should be able to very quickly change operation modes at quickly varying communication needs.

Further known is a DECT cordless telephony system as standardised by ETSI (European Telecommunications Standards Institute). In such a DECT system, a TDMA (Time Division Multiple Access) TDD Crime Division Duplex) system, voice and non-voice communication are standardised in separate standards. For a voice communication or any other real time communication a continuous stream of data should be guaranteed, whereas for a non-voice data communication it should be guaranteed that the radio link is very reliable. To this end, the DECT data standard prescribes various data formats and protocols to make a data communication link reliable. It is however not disclosed how to arrange the system to make it suitable for quickly varying communication needs, in particular multimedia applications.

SUMMARY OF THE INVENTION

It is an object of the present invention to provide a digital communication system of the above kind that is suitable for mixed voice and non-voice data communication where communication needs are quickly varying.

To this end the digital communication system according to the present invention is characterized in that the system is arranged for setting up at least one radio channel at a set-up request from either one of the stations, for connecting the first and second station in a voice and/or non-voice mode on the at least one set-up radio channel at a connect request, and for altering the voice and/or non-voice mode on at least one of the at least one set-up radio channel at a further connect request without releasing the at least one set-up radio channel, whereby the system is arranged for exchanging reliable data in the non-voice mode by applying a reliable data protocol. The present invention is based upon the insight that considerable time is saved when switching over from voice to non-voice communication mode and vice versa when the connection is not first released. A request from an application to change modes can thus very quickly be met. When for instance two channels for non-voice data communication were initially set up for a station, a voice transmission request will immediately result in one channel to be dynamically allocated to voice transmission whereas the non-voice transmission is not interrupted and only operates at a lower transmission rate. For three initially set-up channels, the situation is even better because the data rate of the non-voice communication is then more gradually adapted. When applying DECT techniques, the present invention has the great advantage that other DECT devices that are located in the vicinity of the current station are by no means aware of the mode change, and that thus the system according to the present invention fully complies with the DECT CTR06 coexistence standard which should be complied with for DECT type approvals. The voice communication may include transmission of speech signals, music signals, or similar real time signals.

In an embodiment of the digital communication system according to the present invention the reliable data protocol includes at least one of adding error correction codes to the non-voice data, acknowledging exchanged data, or retransmitting corrupted data. Herewith, reliable transmission of non-voice data can be guaranteed.

A particular and advantageous use of the present invention is the combination of a wireless telephone set and an interactive graphical tablet in one station and the combination of a radio unit and a personal computer in another station. In this way, the interactive graphical tablet can be used as a remote device to emulate input or output to and from the personal computer. In this way one can remotely control one's personal computer so as to run applications under WINDOWS™ for instance. For security reasons one can first block one's PC local keyboard before leaving the room where one's PC is located.

In other embodiments of a digital communication system according to the present invention the stations can communicate with each other in a local stand-alone environment similar to said remote WINDOWS™ application, or the like, or in a cordless telephony environment, with coupling to networks like Ethernet networks if desired, or in a cellular telephony environment, or the like. The present invention may also be embodied in separate modules to be used with other system components. One of such modules can be a PCMCIA module to be inserted in a slot of a personal computer, and another module can be a module for coupling between a DECT radio and an interactive graphical tablet for instance.

BRIEF DESCRIPTION OF THE DRAWINGS

The present invention will now be described, by way of example, with reference to the accompanying drawings, wherein FIG. 1 schematically shows a digital communication system according to the present invention.

Throughout the figures the same reference numerals are used for the same features.

DETAILED DESCRIPTION OF THE INVENTION

Figure 1:
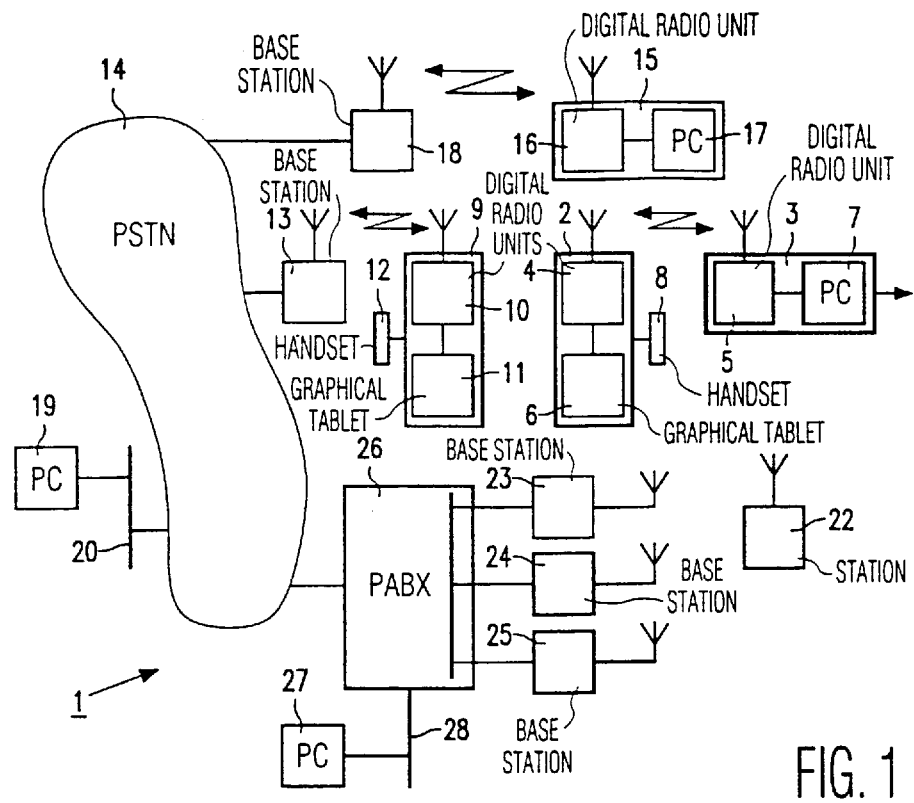
Figure 2:
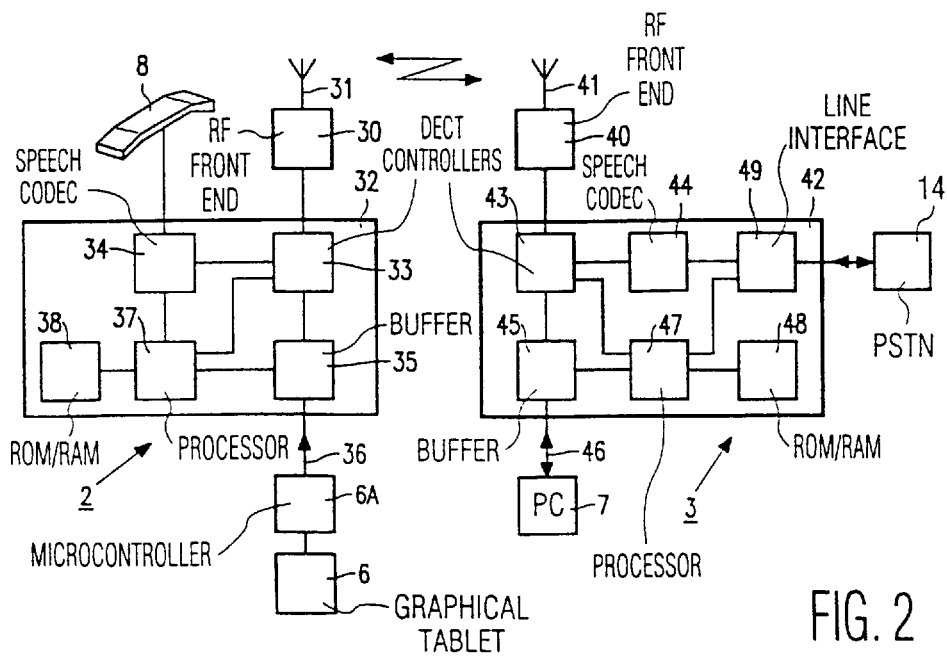
FIG. 2 shows a first and a second station according to the present invention.

FIG. 1 schematically shows a digital communication system 1 according to the present invention comprising a first station 2 and a second station 3. The first station 2 has a first digital radio unit 4 and the second station 3 has a second digital radio unit 5, the radio units 4 and 5 being arranged for wireless communication with each other both in a voice mode and in a non-voice mode of communication so as to allow a multimedia communication for instance. The radio units 4 and 5 can be radio units implementing the so-called DECT (Digital European Cordless Telecommunications) Standard, an air interface as standardised by ETSI (European Telecommunications Standards Institute), but can also at least implement the air interface of other suitable radio standards such as GSM (Global Systems for Mobile Communications). In the examples given, the digital radio units 4 and 5 operate according to the DECT Standard. For a detailed description of DECT, in particular voice communication, referred is to the handbook "Cordless Telecommunications in Europe", H. W. Tuttlebee, Springer Verlag, 1990, Appendix 3, pp. 273–284. On page 278 of this handbook, the DECT physical layer is briefly described and shown as a multicarrier TDMA (Time Division Multiple Access) TDD (Time Division Duplex) DECT frame structure of twice twelve timeslots in downlink and uplink direction, and a DECT message format for voice, such a structure being well-known in the art. On pages 279 and 280 of this handbook, locking of handsets to a base station in idle mode, and call set-up is briefly described. For non-voice reliable data communication, reference is made to the DRAFT DECT Standard pr ETS 300 435, September 1994, pp. 1–13, describing a so-called Type A data transfer with a maximum unidirectional throughput of 24 kbits/s net for instance, and to the ETSI DECT Standard ETS 300 175-3, 1992, p. 1 and pp. 43–52, showing multiplexing in the so-called DECT MAC-layer (Medium Access Control), and unprotected and protected data formats. The first station 2 comprises an interactive graphical tablet 6 which is coupled to the digital radio unit 4. The tablet 6 is coupled to a microcontroller 6A, shown in FIG. 2, for controlling display functions and data transfer functions to and from the tablet, the microcontroller includes a processor, ROM and RAM memory, and I/O-ports. Such a microcontroller is well-known per se. An interactive graphical tablet as such is described in the U.S. Pat. No. 5,231,381 for instance, the contents of which are herewith incorporated by reference. The second station 3 comprises a personal computer 7 which is coupled to the digital radio unit 5. In one embodiment, the combination of the stations 2 and 3 can be can be used as a remotely controlled personal computer while at the same time allowing voice communication between the remote station and other stations. In this embodiment, a handset 8 shown in FIG. 2 is coupled to the station 2, and the station 3 is coupled to a local area network, or to a public switched network, or networks for voice traffic. On the personal computer a program can run that is remotely controlled by the interactive graphical display 6. For instance, a WINDOWS™ application can run on the personal computer 7, the interactive graphical tablet 6 emulating the PC's display screen and keyboard. The system 1 can either be a stand-alone system, a cordless telephone system, or even a cellular telephone system. FIG. 1 further shows other terminal configurations. A station 9 comprising a digital radio unit 10, an interactive graphical tablet 11, and a handset 12 is arranged to communicate with a DECT base station 13 that is coupled to a public switched telecommunications network 14. The station 9 is arranged for mixed voice and non-voice data communications. The handset 12 can be an ordinary telephone receiver, a handsfree telephone set, or the like. Such handsets are known per se. A station 15 is shown comprising a digital radio unit 16 and a personal computer 17, the station 15 being arranged for wireless communication with a DECT base station 18 that is coupled to the network 14. The station 9 can be used as a remote input/output device for the personal computer 17 while at the same time allowing voice communication. A personal computer 19 is shown that is coupled to the public network via an Ethernet 20. The station 9 can also be arranged to allow data communication with the computer 19. Further shown is a station 22 according to the present invention that can communicate to base stations 23, 24, and 25 that are coupled to a private automatic branch exchange PABX 26 having a so-called backbone so as to allow the station 22 to roam in a micro-cellular network formed by the base stations 23, 24, and 25. Such a PABX is described in the U.S. Pat. No. 5,418,838, herewith incorporated by reference. A personal computer 27 is coupled to the PABX 26 via an Ethernet 28. In another embodiment of the present invention, an interactive wireless station according to the present invention can be used to get the latest information from the stock market while at the same time ordering shares by telephone, or can be used in a security environment at airports where a passport photo and passport data can be checked against a central data base while at the same time allowing voice communication, or in similar applications that require mixed voice and non-voice communications with uninterrupted traffic. So, the present invention provides switching of assigned wireless resources between real time voice traffic and reliable non-voice data traffic without first releasing all resources.

FIG. 2 in more detail shows the first and the second stations 2 and 3 according to the present invention. The first station 2 comprises an RF-front-end unit 30 coupled to an antenna 31 and to a control unit 32. The control unit 32 comprises a DECT-controller 33 for controlling data steams to and from the RF-front-end unit 30. When channels have been set-up such channels occupy given frequency-timeslot-combinations. The DECT-controller 33 is coupled to a speech codec 34 that codes and decodes digital voice data from and to the handset 8 to and from the DECT-controller 33. In case of DECT, the codec 34 is a so-called ADPCM codec-(Adaptive Differential Pulse Code Modulation), with a full slot bit rate of 32 kbits/s. The DECT-controller 33 is further coupled to a buffer 35 so as to provide a user data and control data path 36 to an external device such as the interactive graphical tablet 6. The control unit 32 further comprises a processor 37 which is coupled to a ROM/RAM memory 38. The processor 37 controls the codec 34, the DECT-controller 33, the buffer 35, and the user data and control data path 36. The path 36 can be a parallel 8 bit I/O path, a serial I/O path, or any other suitable I/O path for commands and data. The processor 37 can evaluate control data received via the path 36, and control a switch function in the DECT-controller 33 so as to dynamically switch on/off the codec path to one of the set-up channels or radio resources and to at least in part dynamically switch on/off user data received via the path 36 to the set-up channels. Similarly, the second station 3 comprises an RF-front-end unit 40, an antenna 41, and a control unit 42. The control unit 42 comprises a DECT-controller 43, a codec 44, a buffer 45, a user data and control path 46, a processor 47, and a ROM/RAM memory 48. The user data and control data path 46 can be coupled to an external device such a the personal computer 7. For coupling the control unit 42 to the public switched telephone network 14, the control unit 42 comprises a line interface circuit 49.

Figure 3:
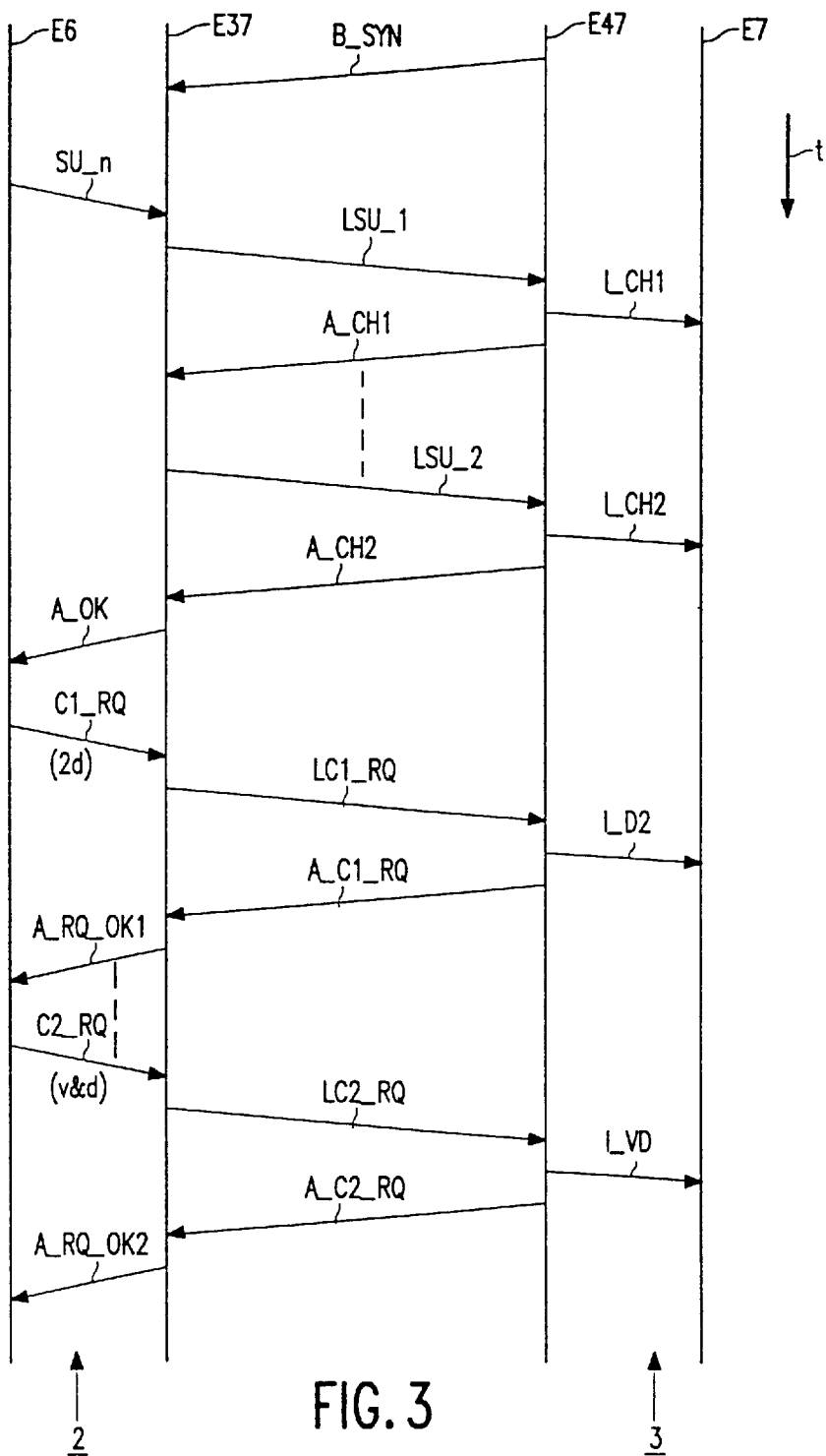
FIG. 3 shows a connection set-up and modification in a system according to the present invention.

FIG. 3 shows a connection set-up and a connection modification in the system 1 according to the present invention. Events as a function of time t are shown for the interactive graphical tablet 6 as an external controlling device, for the personal computer 7, and for the processors 37 and 47. Vertical lines indicate the sources and sinks of events, E6 indicating the interactive graphical tablet 6, E37 indicating the processor 37, E47 indicating the processor 47, and E7 indicating the personal computer 7. In order not to unnecessarily complicate the signalling diagram, detailed signalling at the level of the DECT-controllers 33 and 43 has been omitted, such a signalling being known per se. When necessary for the understanding of the present invention, principles of such more detailed signalling will be indicated. It is assumed that no radio link between the stations 2 and 3 have been set-up and that the station 2 functions as a DECT-handset in idle mode first trying to lock on the station 3 functioning as a DECT-base station. In DECT, at each time instant each base station in active on at least bearer so that handsets can always lock on a base station when they are authorized to do so. With event B_SYN, the processor 37 initiates the station 2 to transmit a sync message via its RF-front-end unit 30. Locking assumed to be successful, in idle mode the station 2 is locked onto the station 3. At a higher layer level, the processor 37 get a set-up command SU_n via the path 36 to initiate set up of n channels, n being a positive integer. In the example given n=2. In DECT a channel is a frequency-timeslot combination. The processor 37 interprets the command SU_n and initiates a lower layer level set-up request or event LSU_1 to be sent to the station 3 via the air interface for getting a first channel. When available, the processor 47 sends an indication I_CH1 to the personal computer 7 to indicate that the first channel is assigned and initiates an acknowledgement of a first channel assignment A_CH1 to be sent to the station 2 via the air interface. Similarly, events LSU_2, and an indication I_CH2 and acknowledgement A_CH2 are initiated by the respective processors 37 and 47. When all requested assignments are successful, the processor 37 initiates an acknowledge event A_OK to be sent via the path 36 to the relevant external device. In the example give, two radio channels have thus been set up. Thereafter, the processor 37 gets a connect request C1_RQ(2d) via the path 36, for two data channels d, no voice channel presently needed. At a lower layer level this connect request C1_RQ(2d) results in a number of sub-requests so as to switch off the relevant codes, to initialize the relevant data buffers, or the like. In the signalling diagram this is schematically indicated with the request event LC1_RQ, an indication I_2D to the personal computer 7, and the acknowledge event A_C1_RQ. When all right, at a higher layer level the processor initiates an acknowledge command A_RQ_OK1 to be sent via the path 36. Thereafter, at a logical level two simultaneous data channels of 32 kbit/s each are available for reliable data communication. To this end, a reliable data transmission protocol is loaded by the processors 37 and 47 from the respective ROM memories 38 and 48 for the two data channels, and data communication can start. It is now assumed that the higher level application wants a voice communication to be started on one of the assigned channels for non-voice data communication because the handset 8 goes off-hook or because an incoming call request is received. Then, the higher level layer or application initiates a further connect request C2_RQ(v&d) for a voice and a data channel to be sent to the processor 37. After processing of the lower level request and acknowledge messages LC2_RQ and A_C2_RQ by the processors 37 and 47, the processor 37 initiates an acknowledge message A_RQ_OK2 to be sent via the path 36. After initiating the request LC2_RQ, the processor 47 sends an indication I_VD to the personal computer 7. Herewith, without interruption of the data transfer, though further data transfer occurs at a lower 32 kbits/s rate, a voice communication can be initiated very quickly. Similarly, the data transfer rate can be altered to a higher bit rate again when voice communication is no longer needed. In a basic form of the present invention only one channel is initially set-up, but this has the disadvantage over the setting up of more than one channel that data transfer is temporarily interrupted when a voice communication is need. When initially more than two channels have been set up this has the advantage that alteration of the non-voice data communication bit rate is more gradually.

Figure 4:
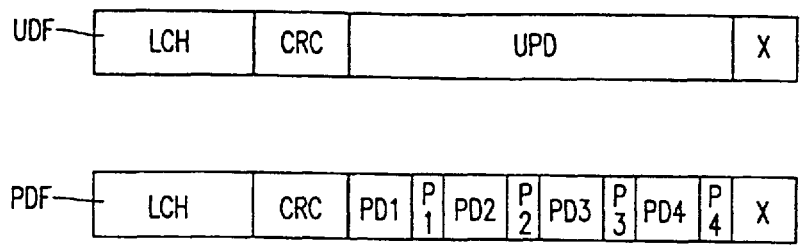
FIG. 4 shows message formats of voice and non-voice data in a system according to the present invention, and FIG. 5 schematically shows a sliding window protocol for reliable non-voice data transfer between two stations in a system according to the present invention.

FIG. 4 shows message formats of voice and non-voice data in the system 1 according to the present invention. Shown is a DECT MAC-layer data format UDF for unprotected data such as real time voice data and a DECT MAC-layer data format PDF for protected data such as reliable non-voice data. Logical control channels LCH occupy 48 bits, and CRC (Cyclic Redundancy Code) of 16 bits is followed by respective 320 bits unprotected data UPD and four groups of 64 bits protected data PD1, PD2, PD3, and PD4 followed by 16 protection bits P1, P2, P3, and P4, respectively. The protection bits P1, P2, P3, and P4 are added to user data to make the data transfer reliable. Furthermore, for getting a reliable non-voice data connection, message acknowledgment and retries are applied in case of corrupted messages. Both unprotected and protected messages have four bit trailer bits X for other purposes. When switching over from voice to non-voice mode, the DECT-controllers 33 and 43 are instructed by the respective processors 37 and 47 to apply the appropriate message protocol.

Figure 5:
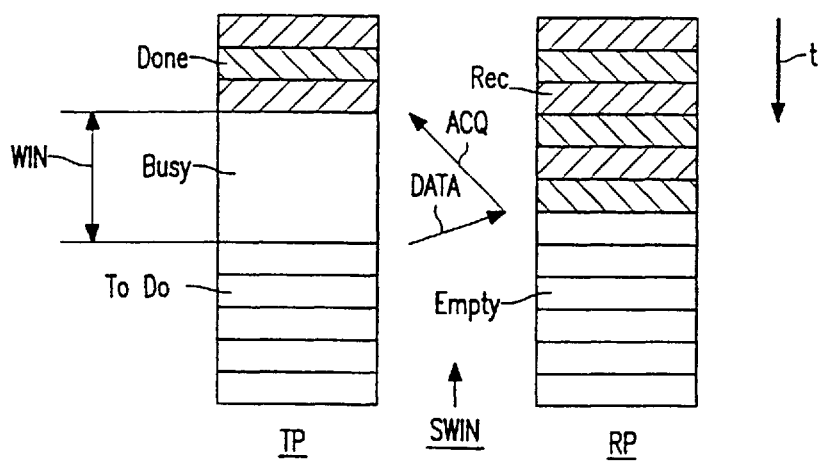

FIG. 5 schematically shows a sliding window protocol SWIN for reliable non-voice data transfer between the two stations 2 and 3 in the system 1 according to the present invention. At the left a pile of transmit packets TP is shown, at the right a pile of received packets is shown. At the left a sliding window WIN is shown that slides along packets under transmission, indicated with 'Busy'. Also shown at the left are packets already transmitted, indicated with 'Done', and packets still to be transmitted, indicated with 'To Do'. Similarly, at receive side, the received packets are indicated with 'Rec' for packets already received, and with 'Empty' for packets still to be received in empty buffer locations. Arrows 'ACQ' and 'DATA' indicate packet acknowledgement and flow of transmit data. As time proceeds, the window WIN slides along the transmit packets. Such a protocol that is known per se does not require extra buffers so that there is no extra transmit delay and is transparent to re-connects because protocol information is maintained across the connections. The protocol is applied in both the stations 2 and 3.

I claim:

1. A digital communication system comprising a first station having a first digital radio unit and a second station having a second digital radio unit that is arranged for wireless communication with the first station, whereby the system is arranged for voice and non-voice communication, wherein the system is arranged for setting up at least two channels at a set-up request from either one of the stations, for connecting the first and second stations in a voice and/or non-voice mode on the at least two channels at a connect request, and for switching between the voice and/or non-voice mode on at least one of the at least two channels at a further connect request without releasing the at least two channels, whereby the system is arranged for exchanging reliable data in the non-voice mode by applying a reliable data protocol.

2. A digital communication system according to claim 1, wherein the reliable data protocol includes at least one of adding error correction codes to the non-voice data, acknowledging exchanged data, or retransmitting corrupted data.

3. A digital communication system according to claim 1, wherein the first station comprises a telephone handset and an interactive graphical tablet.

4. A digital communication system according to claim 1, wherein the second station is coupled to a personal computer.

5. A digital communication system according to claim 4, wherein the personal computer is arranged to operate according to a given user program and the second station is arranged to emulate input and/or output functions of the personal computer on the interactive graphical tablet.

6. A digital communication system according to claim 1, wherein the system is a stand-alone system.

7. A digital communication system according to claim 1, wherein the system is a cordless or cellular telephone system in which the first station is a mobile station.

8. A digital communication system according to claim 4, wherein the system is a DECT system.

9. A communication station for use in a digital communication system arranged for voice and non-voice communication, which communication station comprises a digital radio unit that is arranged for wireless communication with another digital radio unit of a further communication station, wherein the communication station is arranged to send a set-up request to the further communication station which is arranged for setting up at least two channels at the set-up request, and wherein the communication station is further arranged to send a connect request to the further communication station which is arranged for connecting the communication stations in a voice and/or non-voice mode on at least one of the at least two channels at the connect request, and wherein the communication station is further arranged to send a further connect request to the further communication station which is arranged for switching between the voice and/or non-voice mode on said at least one of the at least two channels at the further connect request without releasing the at least two channels, whereby the communication stations are arranged for exchanging reliable data in the non-voice mode by applying a reliable data protocol.

10. A method for use in a communication station to be used in a digital communication system arranged for voice and non-voice communication, which communication station comprises a digital radio unit that is arranged for wireless communication with another digital radio unit of a further communication station, wherein the communication station sends a set-up request to the further communication station, and wherein the further communication station sets up at least two channels at the set-up request, and wherein the communication station further sends a connect request to the further communication station, and wherein the further communication station connects the communication stations in a voice and/or non-voice mode on at least one of the at least two channels at the connect request, and wherein the communication station further sends a further connect request to the further communication station, and wherein the further communication station switches between the voice and/or non-voice mode on said at least one of the at least two channels at the further connect request without releasing the at least two channels, whereby the communication stations are arranged for exchanging reliable data in the non-voice mode by applying a reliable data protocol.

11. A radio communication system comprising first and second stations wherein, in response to a first request for a first communication from one of said first and second stations to another of said first and second stations, a channel is set-up between said first and second stations for carrying one of voice and data signals, said channel being used for a second communication in response to a second request while said first communication is temporarily interrupted without releasing said channel.

12. A radio communication system comprising first and second stations wherein, in response to a first request for a first communication from one of said first and second stations to another of said first and second stations, at least two channels are set-up between said first and second stations for carrying one of voice and data signals, one of said at least two channels being used for a second communication in response to a second request while said first communication is continued on another of said at least two channels without releasing said at least two channels.

* * * * *